(12) United States Patent
Venkitaraman et al.

(10) Patent No.: US 7,620,393 B2
(45) Date of Patent: Nov. 17, 2009

(54) METHOD AND SYSTEM FOR MANAGING COMMUNICATION DEVICES

(75) Inventors: Naayanan Venkitaraman, Schaumburg, IL (US); Mohammed M. Ahmed, Schaumburg, IL (US); Rajesh S. Pazhyannur, Lake Zurich, IL (US); Moon Do Seo, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 490 days.

(21) Appl. No.: 11/616,052

(22) Filed: Dec. 26, 2006

(65) Prior Publication Data

US 2008/0153479 A1 Jun. 26, 2008

(51) Int. Cl.
*H04W 4/00* (2009.01)
(52) U.S. Cl. ............... 455/426.1; 455/435.1; 455/515; 455/518; 455/519
(58) Field of Classification Search ............... 455/426.1, 455/518, 519, 435.1; 709/203
See application file for complete search history.

(56) References Cited

U.S. PATENT DOCUMENTS

| 5,790,180 A | 8/1998 | Wild | |
| 6,873,854 B2 | 3/2005 | Crockett et al. | |
| 2004/0003046 A1* | 1/2004 | Grabelsky et al. | 709/206 |
| 2004/0156363 A1* | 8/2004 | Walls et al. | 370/389 |
| 2007/0266077 A1* | 11/2007 | Wengrovitz | 709/203 |

OTHER PUBLICATIONS

Shacham, Ron et al.: The Virtual Device: Expanding Wireless Communication Services through Service Discovery and Session Mobility, Columbia University Computer Science Technical Report, pp. 1-10.

* cited by examiner

*Primary Examiner*—David Q Nguyen

(57) ABSTRACT

A method (200) for managing communication devices is disclosed. The method includes receiving a request by the receiver (304) from a first communication device, for placing the first communication device in an active communication session. The request comprises information corresponding to identity of the first communication device. The method (200) also includes identifying an active communication session on the basis of identity of the first communication device. Further, the method (200) includes placing the first communication device in the active communication session.

19 Claims, 5 Drawing Sheets

METHOD AND SYSTEM FOR MANAGING COMMUNICATION DEVICES

FIELD OF THE INVENTION

This invention generally relates to communication devices, and more particularly, to managing communication sessions between communication devices.

BACKGROUND OF THE INVENTION

A communication network can include a plurality of communication devices. Examples of a communication network include a Global System for Mobile Communications (GSM) network, an Advanced Mobile Phone System (AMPS) network, a Universal Mobile Telecommunication System (UMTS) network, a Digital Cellular System (DCS) network, a Local Area Network (LAN) and a Wireless Fidelity (WiFi) network. The communication network enables communication among the plurality of communication devices. Examples of a communication device can be a mobile phone, a fixed phone, a videophone, a softphone, a computer, a satellite phone, and so forth. The plurality of communication devices can communicate with each other by establishing communication sessions.

However, a user of a communication device may intend to modify an ongoing communication session for various reasons. For example, a user, communicating on a fixed line phone at his workplace, might want to continue the ongoing conversation on his mobile phone, when he leaves his workplace.

There exist various methods that enable modification of an ongoing communication session. In one such method, a user willing to transfer a call to another communication device has to dial in to a conference bridge number from another device. This requires the user to explicitly identify the conference the user wishes to join and causes a break in the ongoing conversation.

In another method, a communication device can be invited to join an ongoing communication session, when a Session Initiation Protocol (SIP) enabled device generates a REFER message that contains the information for replacement such as the identity of the new communication device and the audio/video stream carrying capability. The REFER message must be generated by a device that is already in the ongoing communication session.

In yet another method, an invitation with a "replaces" header can be sent from a first SIP enabled communication device to another SIP enabled communication device and thereafter the call can be transferred to the first SIP enabled communication device.

However, the mentioned methods can have one or more limitations. Firstly, the one or more of the above-mentioned methods may require manual intervention to modify an ongoing communication session. Secondly, the one or more of the above-mentioned methods may cause interruption in an ongoing conversation. Thirdly, the methods may be implemented only for Voice over Internet Protocol (VoIP) enabled communication devices, and may not be optimized for multimedia calls involving multiple components such as audio, video and data. Fourthly, in case of SIP enabled communication devices, the SIP enabled communication devices are required to explicitly identify the ongoing communication session.

In the light from the above discussion, there exists a need for a method and system for modifying an ongoing communication session.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
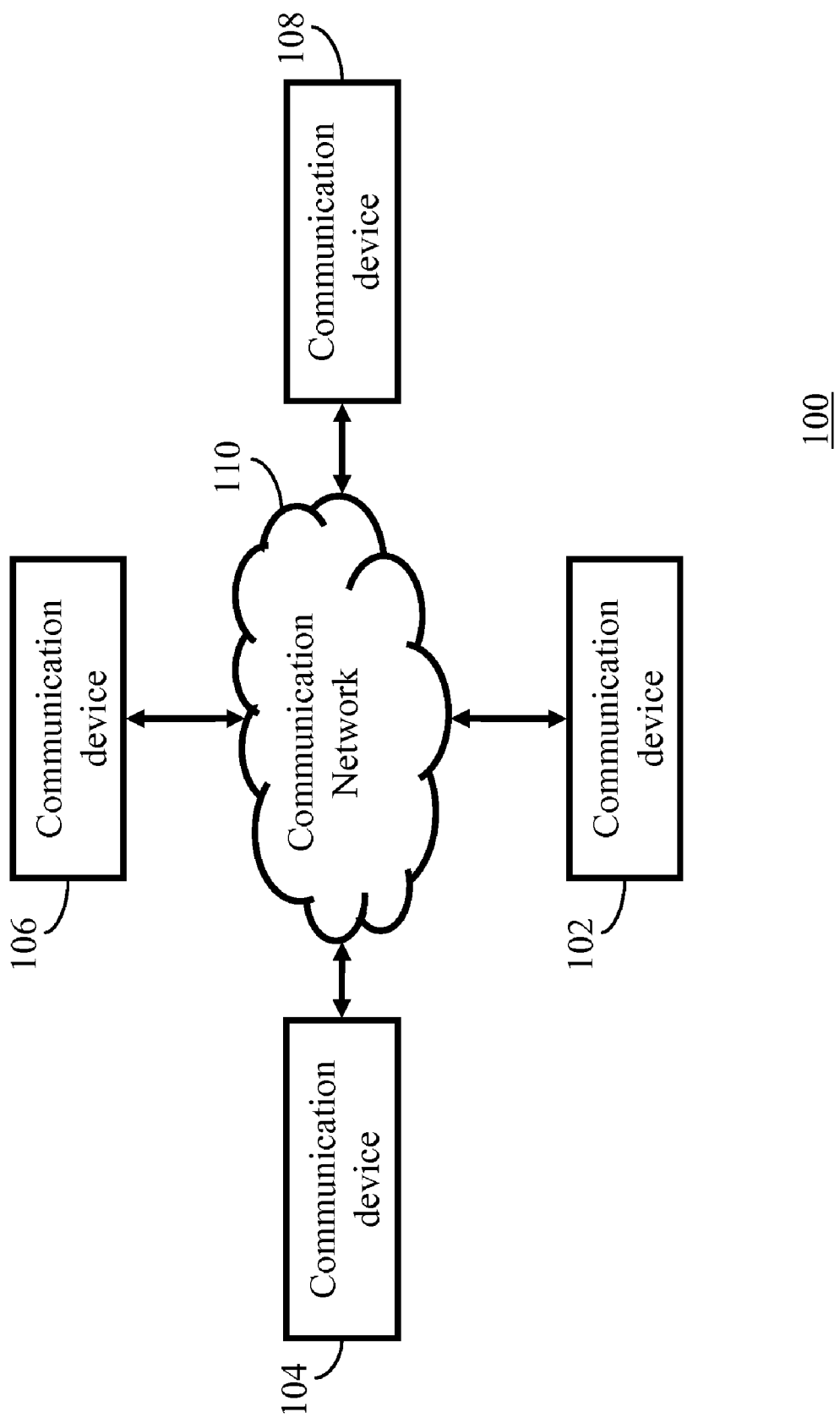
FIG. 1 illustrates an exemplary environment, where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for managing communication devices in accordance with various embodiment of the present invention, it should be observed that the present invention utilizes a combination of method steps and apparatus components related to the method and system for managing communication devices in communication sessions. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element.

A "set", as used in this document, means a non-empty set, i.e., comprising at least one member. The term "another," as used in this document, is defined as at least a second or more. The terms "includes" and/or "having", as used herein, are defined as comprising.

For an embodiment, a method for managing communication devices is provided. The method includes receiving a request to place a first communication device in an active communication session. The request includes information related to the identification of the first communication device. Further, the method includes the step of identifying a communication session, based on the information related to identity of the first communication device. The communication session is identified from a set of communication sessions. Moreover, the method includes the step of placing at least the first communication device in the communication session.

In another embodiment, a session managing system for managing communication devices is provided. The communication device includes a receiver capable of receiving a request to place a first communication device in an active communication session. The request is received from the first communication device. The request includes the identity of the first communication device. The session managing system also includes a processor that can identify an active communication session, based on the identity of the first communication device. The second communication device is identified from a set of active communication sessions. Moreover, the processor can also place the first communication device in the active communication session.

In another embodiment a method for managing communication devices in a session is provided: The method includes receiving a request, the request comprising information related to identification of a first user. The method includes the step of identifying a first communication device based on the information related to identity of the first user. Further the method includes identifying an active communication session from a set of active communication sessions based on the information related to identity of the first user. The method also includes the step of placing at least the first device in the active communication session.

FIG. 1 illustrates an exemplary environment 100, in accordance with an embodiment of the present invention. The environment 100 includes communication devices 102, 104, 108, and 106 communicating via a communication network 110. Examples of a communication device include, but are not limited to, a mobile phone, a personal computer, a residential gateway, a fixed line phone, a cordless phone, a videophone, a satellite phone, and a voice over internet protocol (VoIP) phone. The communication network 110 enables communication using various network elements such as an application server, a router, a hub, and so forth. Examples of a communication network include a Global System for Mobile Communications (GSM) network, an Advanced Mobile Phone System (AMPS) network, a Universal Mobile Telecommunication System (UMTS) network, a Digital Cellular System (DCS) network, a Local Area Network (LAN), and a Wireless Fidelity (WiFi) network.

Figure 2:
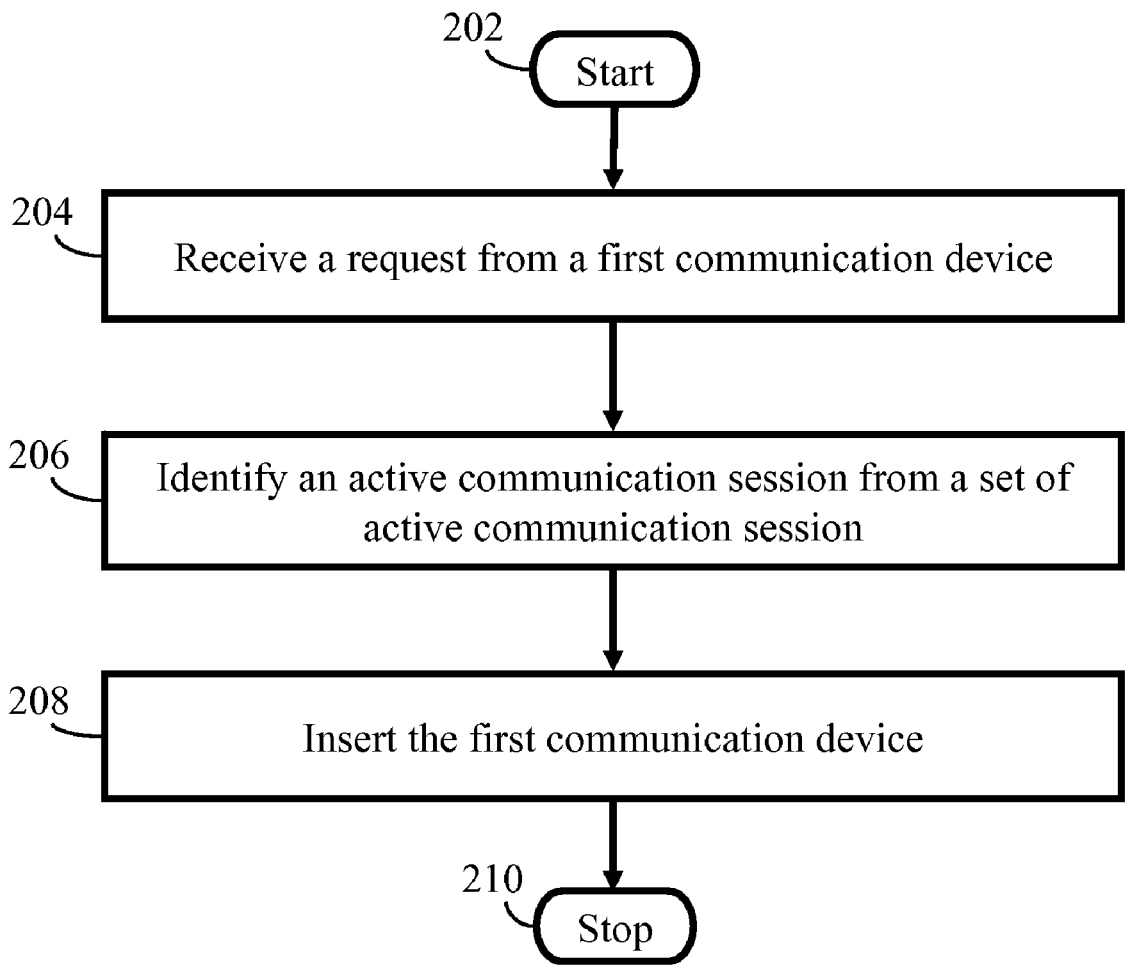
FIG. 2 is a flow diagram illustrating a method for managing communication devices, in accordance with an embodiment of the present invention.

FIG. 2 illustrates a flow diagram 200 illustrating a method for managing communication devices, in accordance with an embodiment of the present invention. The method starts at step 202. At step 204, a request for placing a first communication device 102 in an active communication session is received. For example, a pre-defined number can be dialed from a mobile phone. Dialing of the pre-defined number can act as a request to place the mobile phone in an ongoing conversation. The request includes information regarding the identity of the first communication device 102. For example, the identity of the first communication device 102 can be the phone number or a field in a session control protocol message (for example 'From:' field in a Session Initiation Protocol (SIP) INVITE message. For another example, an identity (such as email address) of a user can be mapped to the identification of a communication device, using schemes such as a preconfigured username-to-deviceID mapping table. In another embodiment, the request can include location of the device and an authentication code generated using a user private key. The location can be used to determine a set of users (for instance a home location can be mapped to members of a family) and then the user is determined based on the key used to generate the authentication code. The information regarding the identity of the first communication device 102 can be provided in form of a text message, a voice call, a data call, a multi-media message, a session initiation protocol message and a multi-media call. For example, an internet protocol (IP) packet containing the identity such as an email address of a user can be sent from a mobile phone of the user. The email address can then be mapped to a phone number corresponding to the mobile phone, using a preconfigured table.

At step 206, an active communication session is identified, based on the identity related to the first communication device 102. Unlike typical ways to identify the active communication session (using the session id or the user provided conference code), the active communication session is identified using the information related to the identity of the first communication device 102. For example, on receiving a request with an identifier related to a mobile phone, an authorization list corresponding to the mobile phone is scanned to determine if any devices have authorized the mobile phone or a user corresponding to the mobile phone. If a fixed line phone that has authorized the mobile phone and involved in a communication session is identified, then that communication session is chosen as the communication session to be modified.

Further, at step 208, the first communication device 102 is placed in the active communication session. For example, when an ongoing conversation is identified for a mobile phone, the mobile phone is placed in the conversation. In an embodiment, a particular communication device can be placed in the conversation by sending an INVITE message to another communication device in communication session. Further, the parameters such as IP address corresponding to the first communication device can also be sent along with the INVITE message. In an embodiment, when the first communication device is placed in the active communication session, the device that identified the first communication device 102 is removed from the active communication session. For example, if a fixed line phone has authorized a mobile phone, the fixed line phone is removed from the ongoing conversation, when the mobile phone is included in the conversation. Thereafter, the method terminates at step 210.

Figure 3:
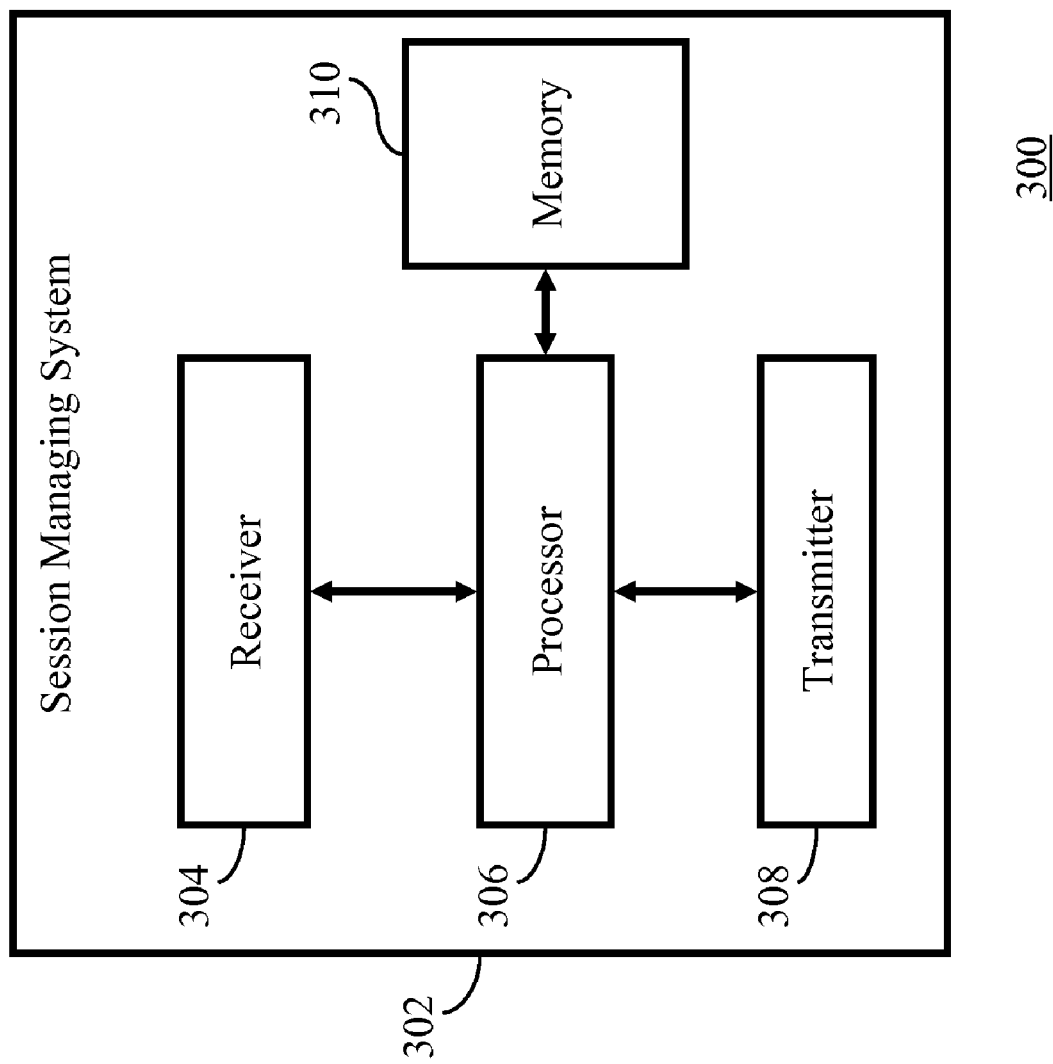
FIG. 3 is a block diagram of a session managing system, in accordance with an embodiment of the present invention.

FIG. 3 is a block diagram of a session managing system 302, in accordance with an embodiment of the present invention. The session managing system 302 can be either a logical unit (a software application) or a hardware unit. The session managing system 302 can be located at a network element such as an application server in the communication network 110. For another embodiment, the session managing system can be located at the communication device 102, 104, 108 or 106.

The session managing system 302 includes a receiver 304, a processor 306, a transmitter 308 and memory 310. The receiver 304 can receive a request from a first communication device 102 to place the first communication device 102 in an active communication session. The request can include the information of the identity of the first communication device 102 such as a phone number.

Thereafter, the processor 306 identifies the active communication session from a set of active communication sessions. For an embodiment, the processor 306 identifies a set of communication devices and then identifies corresponding set of active communication session. For an embodiment, the set of communication devices is identified, based on the locations of the first communication device 102. For example, consider a scenario, where a user calls from a car phone to join an ongoing conversation between a first fixed line phone and a mobile phone. A pre-defined number is dialed from the car phone, and it acts as a request to place the car phone in the ongoing conversation. The set of communication devices, such as a home fixed line phone, and office fixed line phone, which have authorized the phone number of the car phone, are identified. Now, ongoing conversations involving the home fixed line phone and the office fixed line phone are identified. Thereafter, if the locations of mobile phone suggest that is in vicinity of the home fixed line phone, then the ongoing conversation at the home fixed line phone is identified, to place the car phone in the conversation. It should be noted that identification of an active communication session is explained with reference to the locations of the communication devices; however, it will be clear to a person ordinary skilled in the art that the active communication session can be identified using other techniques also. The identification of the active communication session is explained in detail with reference to FIG. 4. Thereafter, the processor 306 places the first communication device 102 in the active communication session. Various information such as the active communication session, authorization profile of devices, and device location can be stored in memory 310.

For an embodiment, the processor 306 identifies the active communication session using various mapping algorithms. The mapping algorithm is a set of steps to identify the active communication session. The mapping algorithm can be based on the location of a communication device, the type of the communication device, the identity of the communication device, a pre-defined precedence sequence of communication devices, and so forth.

An example of a mapping algorithm based on the location of a communication device can be the one that involves determination of the location of the first communication device and the location of active devices that have authorized the first communication devices and then choosing from a set of sessions, a session that involves devices that are in proximity of the first communication device. The location of the communication device can be determined using for example a location server, the Internet Protocol (IP) address and/or Global Positioning System (GPS) corresponding to the device. The IP address of the communication device will be within a particular sub network. Further, other communication devices having IP addresses in the same subnetwork are identified to form the set of communication devices. Similarly, communication devices having the coordinates within a particular range, as indicated by GPS, can be associated together to form the set of communication devices.

An example of a mapping algorithm based on the identity of a communication device can be the one that involves identification of the first communication device 102. For example International Mobile Equipment Identity (IMEI) number is used by the GSM network to identify valid devices and further the identity of owner. Further a session involving another device associated with the same owner can be identified to form the active communication session.

An example of a mapping algorithm based on the type of the first communication device can be the one that identifies the capability of the first communication device and chooses a session that is most compatible with the first communication device. For example when the first communication device is a mobile phone a audio call is chosen as the active communication session to be modified, instead of choosing another authorized session involving a shared workbench.

An example of a mapping algorithm based on a predefined precedence sequence of communication devices can be use of logical conditions to select communication devices. An example of a logical condition can be preferentially selecting a session involving a land line phone over a virtual calling number.

For an embodiment, the session managing system 302 also includes the transmitter 308. For an embodiment, the processor 306 instructs the transmitter 308 to determine the status of a communication device in the active communication session. When the communication device is involved in an active communication session, the status of the communication device is said to active. For example, a mobile phone is said to be in an active state, when the mobile phone is involved in an ongoing conversation. When the communication device is not involved in an active communication session, the status of the communication device is said to be inactive. For example, a mobile phone, when not in any ongoing conversation, will said to be in an inactive state. For an embodiment, the transmitter 308 also sends a message to the communication device to obtain its status.

For an embodiment, the status of a communication device is determined on the basis of a side channel. The side channel may correspond to the excess bandwidth other than that is utilized in the active communication session. An example of such an arrangement that can be used to communicate through side channel can be a part of a second interface (for example a wireless local area network (WLAN) interface) in a communication device. Another example of such an arrangement is Basic Rate ISDN ("BRI") service. In this service, a low bandwidth D channel is always connected between the user and the communication network. The low bandwidth D channel is used to send IP packets and signaling information. The B channels are used for data and voice services.

For an embodiment, the information regarding the status of the communication devices can be obtained from a Session Initiation Protocol (SIP) proxy, a presence and availability server, or via direct communication from the communication devices. The SIP proxy can be a component of the communication network 110. The SIP proxy is used to recognize one or more of communication devices that can be authorized to be join an ongoing conversation. The SIP proxy is an intermediary system between any two or more SIP enabled devices. For example, the SIP proxy can be involved in setting up a call. SIP proxy can also be used to offload tasks and simplify implementation for the end user devices. For example, when a SIP enabled phone contacts another communication device using a dial-in number, a request is sent to the concerned SIP proxy. The SIP proxy finds out whether the dial in number corresponds to a fixed phone, a fax, or a mobile phone.

The information regarding the status of the communication devices can be used to determine the active communication session. The active communication session is one from the set of active communication sessions. After the active communication session is identified, the processor 306 checks the compatibility of the first communication device 102 along with the features of the active communication session. The compatibility is checked in order to determine whether the first communication device 102 can perform optimally, when placed in the active communication session. For example, it is verified whether a mobile phone is capable of displaying video, before placing it in an ongoing video-conference. If the check for compatibility fails, the transmitter 308 notifies the first communication device 102 and/or the set of communication devices. For example, if a mobile phone, incompatible with an ongoing video-conference, attempts to join a video conference, a message can be sent to the mobile phone stating its incompatibility with the ongoing conference. In another embodiment the mobile phone is placed in the audio portion of the session and information about other components of the session (such as IP address of a video server) is sent to the mobile phone.

Figure 4:
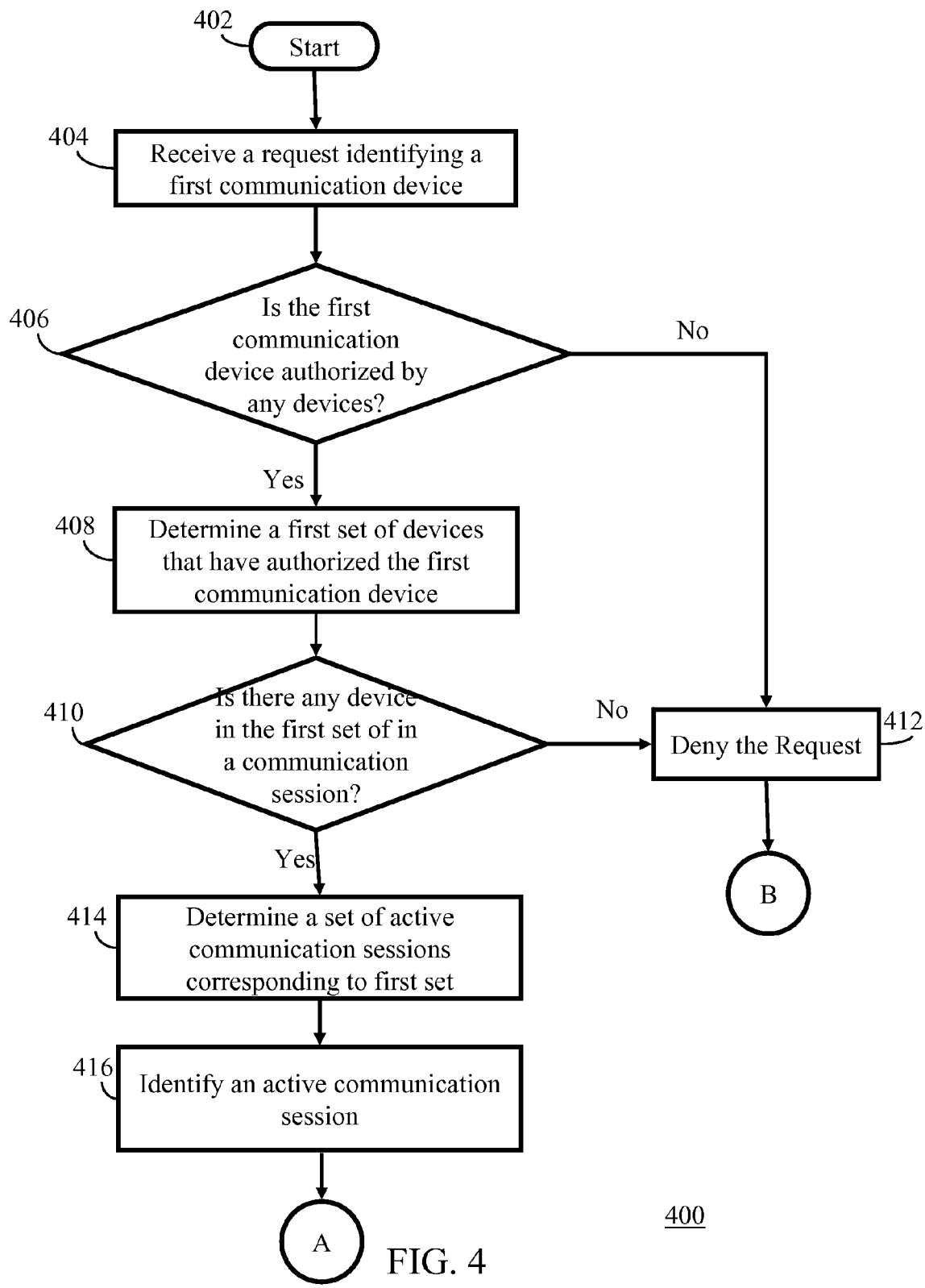
FIGS. 4 and 5 is a flow diagram illustrating a method for managing communication devices, in accordance with another embodiment of the present invention.
Figure 5:
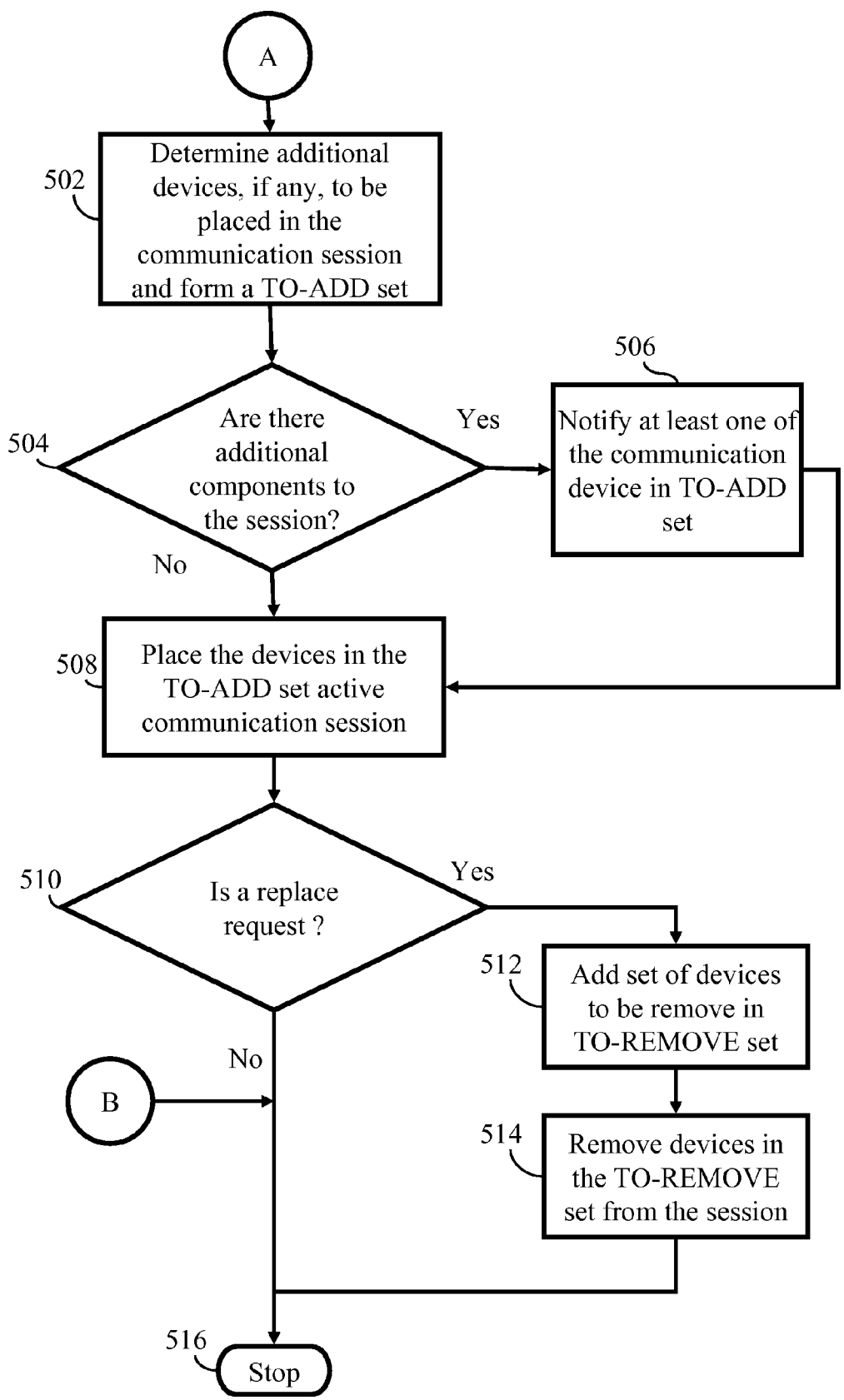

FIGS. 4 and 5 illustrates a flow diagram 400 illustrating a method for managing communication devices, in accordance with another embodiment of the present invention. It should be noted that although the method has been explained with reference to the communication device 102, however, the method can be implemented with respect to any other communication device as well. Moreover, the method can include fewer or greater number of steps than shown.

At step 402, the method is initiated. At step 404, a request is received to place the first communication device 102 in an active communication session. For an embodiment, the request is received by the receiver 304. The request includes the identity related to the first communication device 102. An example of identity of the communication device can be the phone number of the communication device. In another embodiment the identity may be a user name such as an email address. For an embodiment, the request can be a text message, a voice call, a data call, a multi-media message and a multi-media call.

At step 406, it is checked whether any communication device in the communication network 110 authorizes the first communication device 102. For example, a car phone places a request for joining a communication session. A mobile phone and a fixed line that authorize the phone number of the car phone can be identified. In another embodiment the authorization list contain user name and the list of devices authorizing the user.

When no communication device authorizes the first communication device 102, then the request is denied at step 412 and the method terminates at step 516. If, at step 406, one or more than one communication devices are identified then step 408 is followed. At step 408, the identified communication devices are grouped together to form a first set of communication devices.

At step 410, it is checked whether any communication device in the first set of communication devices is active, i.e. involved in a communication session. When no communication device in the first set of communication devices is part of a communication session, then the request is denied at step 412 and the method terminates at step 516. If one or more than one communication device is identified to be a part of the communication session then step 414 is followed. Further, at step 414, a set of active communication sessions is identified corresponding to the first set of the communication devices. The set of active communication sessions includes one or more active communications sessions involving communication devices from the first set of communication devices. Further, at step 416, the active communication session is identified from the set of active communication sessions. For an embodiment, a mapping algorithm is applied to identify a communication session from the set of communication session sessions. The mapping algorithm can be based on the location of the first communication device 102, the type of the first communication device 102, the identity of the communication device, a pre-defined precedence sequence of communication devices, and so. For instance, when multiple sessions are identified, a session involving a device in the active set which has the same location as the first communication device is chosen.

Thereafter, at step 502, the session managing system 302 correlates the identity of the first communication device 102 with a second set of communication devices. The TO-ADD set can be comprised of communication devices from the second set of communication devices. Not all communication devices from the second set of communication devices are part of the TO-ADD set. In one embodiment the second set of communication devices is identified on the basis of substantial proximity with the first communication device 102. Substantial proximity of any communication device can be established with the help of short-range communication networks such as blue-tooth or an infrared communication link. Substantial proximity of any communication device can also be established with the help of the location server, GPS, and user policies. Location servers can sort a list of IP address stored at the application server to recognize the set of communication devices that are geographically close to each other. Similarly, the user policies can be used to identify communication devices that are registered with the same user. The user policies can also contain permissions for authorization of a communication device to join the active communication session. The TO-ADD set of communication devices comprises the first communication device 102 and any additional devices chosen to receive data incompatible with the first communication device 102. An example of second communication device can be a desktop computer that can display the video data associated with the call, a laptop, or an audio video unit that can display the audio or video data as per the need.

For example, a mobile phone, not fully compatible with an ongoing multi-media communication session, attempts to join the ongoing multi-media communication session. In such a case the mobile phone may be made part of the audio portion of the conference. The other media portions of the ongoing multi-media communication session are sent to the communication devices from the second set of communication devices. The communication devices from the second set of communication devices are in proximity of the mobile phone and have authorized the user of the mobile phone. In another embodiment, the TO-ADD set can also include devices in proximity to the other devices in the communication session. For example, when an audio session is between device A and device B is transferred from device A to a first device, the TO-ADD set may comprise of devices in proximity of first device and devices in proximity of device B. Thus an audio only session may be transformed into a audio and video session involving device B, the first device and selected devices in their proximity.

At step 504 it is checked whether any additional components need to be part of the active communication session. The additional components can comprise of communication devices from the second set of communication devices. If additional components have to be added, then step 506 is followed. At step 506, a notification is sent to one or more of the communication devices in the TO-ADD set. For example, a message can be sent to the first device, say a mobile phone, stating its incompatibility with the ongoing conference and information about the other portions of the active communication session. For instance, the uniform resource locator (URL) and the necessary credentials corresponding to a server, hosting a shared workbench, may be sent to the mobile phone. The mobile phone in turn may pass this information to local electronic devices such as a desktop computer using, for instance, a blue tooth wireless interface, triggering the appropriate application in the desktop computer to join the video stream corresponding to the shared workbench. Thereafter, step 508 is followed.

If no additional components need to be added to the active communication session, then step 508 is followed. At step 508, the communication devices in the TO-ADD set are placed in the active communication session. In an embodiment, a particular communication device can be placed in the conversation by sending a Session Initiation Protocol (SIP) INVITE message to the communication device and at least another communication device in communication session. In some embodiments, more than one communication devices may be selected and placed in the active communication session. Furthermore additional information about the active communication session such as the URL of the server hosting the file being discussed in the call or the IP address of server hosting a shared work-board can be sent to a particular communication device. The particular communication device can in turn use the information locally or request another electronic device to act on the information.

Thereafter, at step 510, it is checked whether a replace request is present. The replace request can be made for removing a second communication device or a second set of communication devices. If the replace request is not present, the method terminates at step 516. In one embodiment the request message can be determined to be a replace request based on the port to which the request message is sent. In another embodiment a value carried in the message may indicate that the request is a replace request.

If the second communication device (or the second set of communication devices) is to be removed, then at step 512, the second communication device (or the second set of communication devices) is added to a TO-REMOVE set. In one embodiment the TO-REMOVE set comprises devices in the session that authorize the first device to join the session. Thereafter, the step 514 is followed. At step 514, the second communication device (or the second set of communication devices) is removed from the active communication session. In an embodiment a device in the TO-REMOVE set is removed from the active communication session by sending a BYE message to the device. Thereafter, the method terminates at step 516.

Various embodiments of the method and system for managing communication devices have been described above. Various embodiments of the present invention have significant advantages over the prior art. Firstly, the method and system ensures no interruption in an ongoing conversation. Secondly the method and system provides compatibility among communication devices that use different technologies. Further, the method and system eliminates the need of manual intervention, when a communication device needs to remove itself or join the active call. Moreover, in this invention all communication devices in the call use the most optimum form of communication available to them.

It will be appreciated that the method and system for communicating within a wireless communication system described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method to manage communication sessions in a plurality of communication networks. Alternatively, some or all the functions could be implemented by a state machine that has no stored program instructions, or in one or more application-specific integrated circuits (ASICs), in which each function or some combinations of certain of the functions are implemented as custom logic. Of course, a combination of the two approaches could be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims as issued.

What is claimed is:

1. A method for managing communication devices, the method comprising the steps of:

receiving by a processor a request for placing a first communication device in an active communication session, the request comprising information related to an identity of the first communication device;

identifying by the processor an active communication session from a set of active communication sessions based on the information related to the identity of the first communication device by ascertaining a set of communication devices based on at least one mapping algorithm, the at least one mapping algorithm being based on location of the first communication device, type of the first communication device, a pre-defined precedence order of communication devices, the identity of the first communication device, the set of communication devices being in the active communication session at instant of the request, and ascertaining a set of communication sessions based on the set of communication devices to identify the active communication session; and placing by the processor the first communication device in the active communication session.

2. The method as recited in claim 1, wherein the step of identifying the active communication session further comprises the steps of:

determining a set of communication devices authorizing the first communication device based on the identity of the first communication device, the first set of communication devices being in the active communication session when the request is received.

3. The method as recited in claim 1, wherein the step of identifying the active communication session further comprises the steps of:

determining status of the set of communication devices, wherein the status is one of an active state and an inactive state, in the active state a communication device is in an active communication session and in the inactive state communication device is not in an active communication session.

4. The method as recited in claim 1 further comprising the step of removing a second communication device from the active communication session.

5. The method as recited in claim 4, wherein the second communication device comprises a device in the active communication session and being in proximity of the first communication device.

6. The method as recited in claim 1, wherein the request is one of a text message, a multi-media message, a voice call, a data call, a session control protocol message, and a multi-media call.

7. The method as recited in claim 1 further comprising the steps of:
   determining a third set of communication devices in proximity to the first communication device; and
   placing the third set of communication devices in the active communication session.

8. The method as recited in claim 1 further comprising the step of checking compatibility of the first communication device with features of the active communication session, prior to placing the first communication device in the active communication session.

9. The method as recited in claim 8 further comprising the step of notifying at least one of the first communication device and the set of communication devices when the first communication device is incompatible with the active communication session.

10. The method as recited in claim 1, wherein the first communication device and the second communication device are one of mobile phones, cordless phones, fixed line phones, satellite phones and Voice over Internet Protocol (VoIP) phone.

11. The method as recited in claim 8 further comprising the step of notifying at least one of the first communication device and the set of communication devices with information about other components of the active communication session.

12. A session managing system for managing communication devices, the session managing system comprising:
   a receiver capable of receiving a request for placing a first communication device in an active communication session, the request comprising information related to an identity of the first communication device; and
   a processor capable of:
      identifying an active communication session from a set of active communication sessions based on the information related to the identity of the first communication device by ascertaining a set of communication devices based on at least one mapping algorithm, the at least one mapping algorithm being based on location of the first communication device, type of the first communication device, a pre-defined precedence order of communication devices, the identity of the first communication device, the set of communication devices being in the active communication session at instant of the request, and ascertaining a set of communication sessions based on the set of communication devices to identify the active communication session; and
      placing the first communication device in the active communication session.

13. The session managing system as recited in claim 12, wherein the processing unit is further capable of determining compatibility of the first communication device with features of the active communication session, prior to inserting the first communication device in the active communication session.

14. The session managing system as recited in claim 12 further comprising a transmitter capable of conveying notifications and requests to the first communication device and a set of communication devices in the active communication session.

15. The session managing system as recited in claim 12, wherein the processor is capable of determining location of the first communication device based on information regarding the identity of the first communication device.

16. A method for managing communication devices in a session, the method comprising the steps of:
   receiving by a processor a request comprising information related to an identity of a first user;
   identifying at least one device of a first set of communication devices based on the information related to the identity of the first user;
   identifying by the processor an active communication session from a set of active communication sessions based on the information related to the identity of the first user by ascertaining a set of communication devices based on at least one mapping algorithm, the at least one mapping algorithm being based on location of the first communication device, type of the first communication device, a pre-defined precedence order of communication devices, the identity of the first communication device, the set of communication devices being in the active communication session at instant of the request, and ascertaining a set of communication sessions based on the set of communication devices to identify the active communication session; and
   placing by the processor at least the first set of communication devices in the active communication session.

17. The method of claim 16 further comprising the step of removing at least one device from the active communication session.

18. The method of claim 16 further comprising the step of sending a message to at least one of the devices in the first set of communication devices, the message comprising information about additional components of the communication session.

19. The method of claim 16 wherein the step of identifying the active communication session further comprises the step of: determining a set of active communication devices that have authorized the user.

* * * * *